C. M. LAURITZEN.
MACHINE FOR CUTTING, BEATING, AND PULVERIZING.
APPLICATION FILED FEB. 29, 1908.
939,276.
Patented Nov. 9, 1909.
4 SHEETS—SHEET 1.
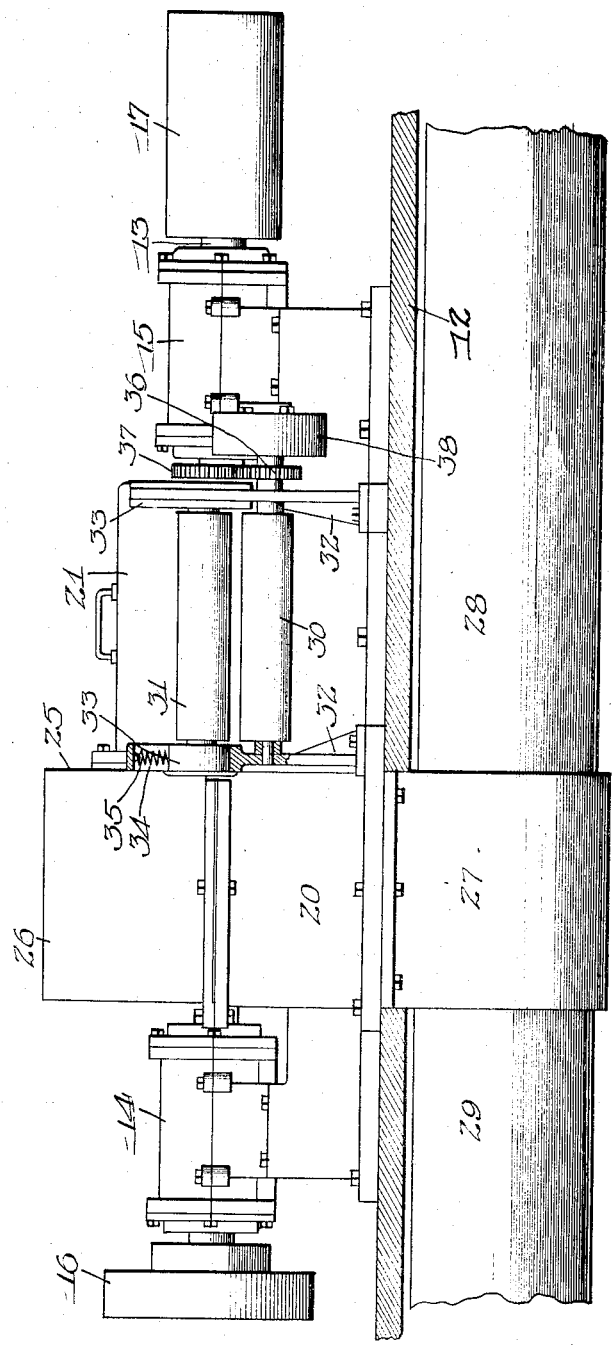

C. M. LAURITZEN.
MACHINE FOR CUTTING, BEATING, AND PULVERIZING.
APPLICATION FILED FEB. 29, 1908.
939,276.
Patented Nov. 9, 1909.
4 SHEETS—SHEET 2.
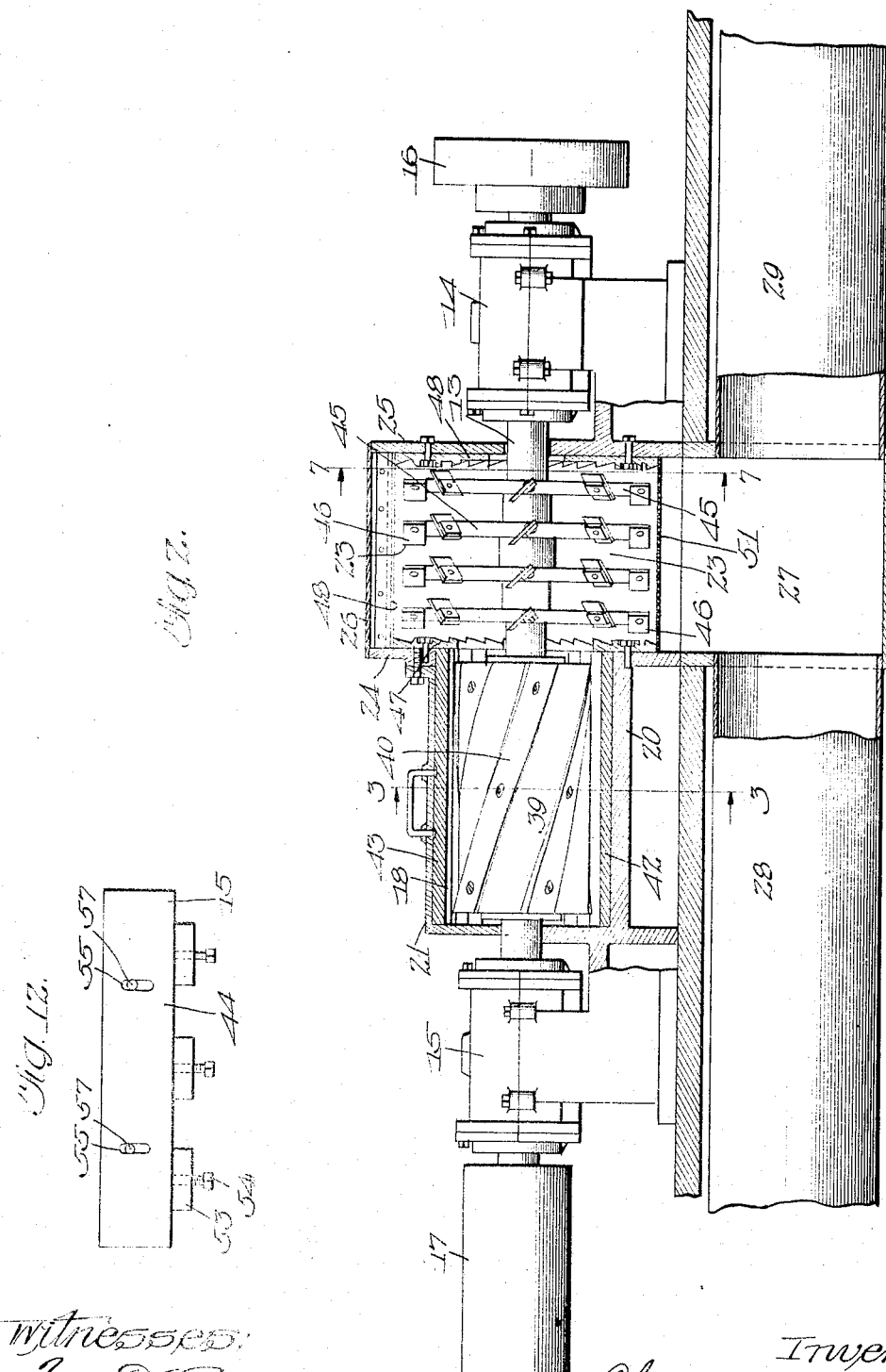
Witnesses:
Inventor:
Christian Marius Lauritzen
By O. R. Barnett
Atty

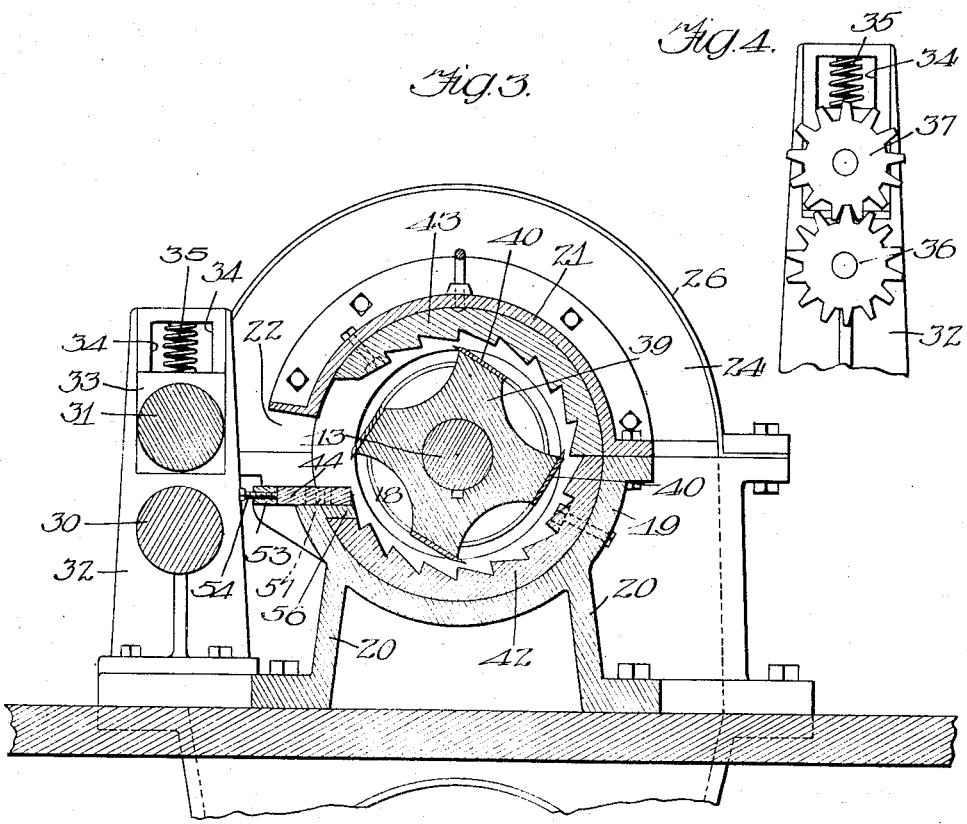
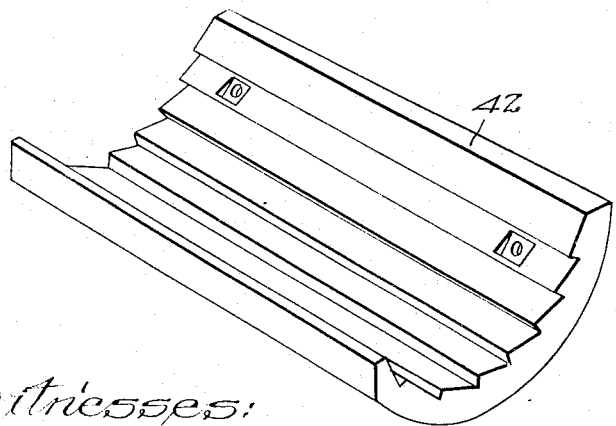
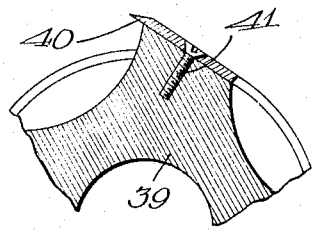

C. M. LAURITZEN.
MACHINE FOR CUTTING, BEATING, AND PULVERIZING.
APPLICATION FILED FEB. 29, 1908.
939,276.
Patented Nov. 9, 1909.
4 SHEETS—SHEET 4.
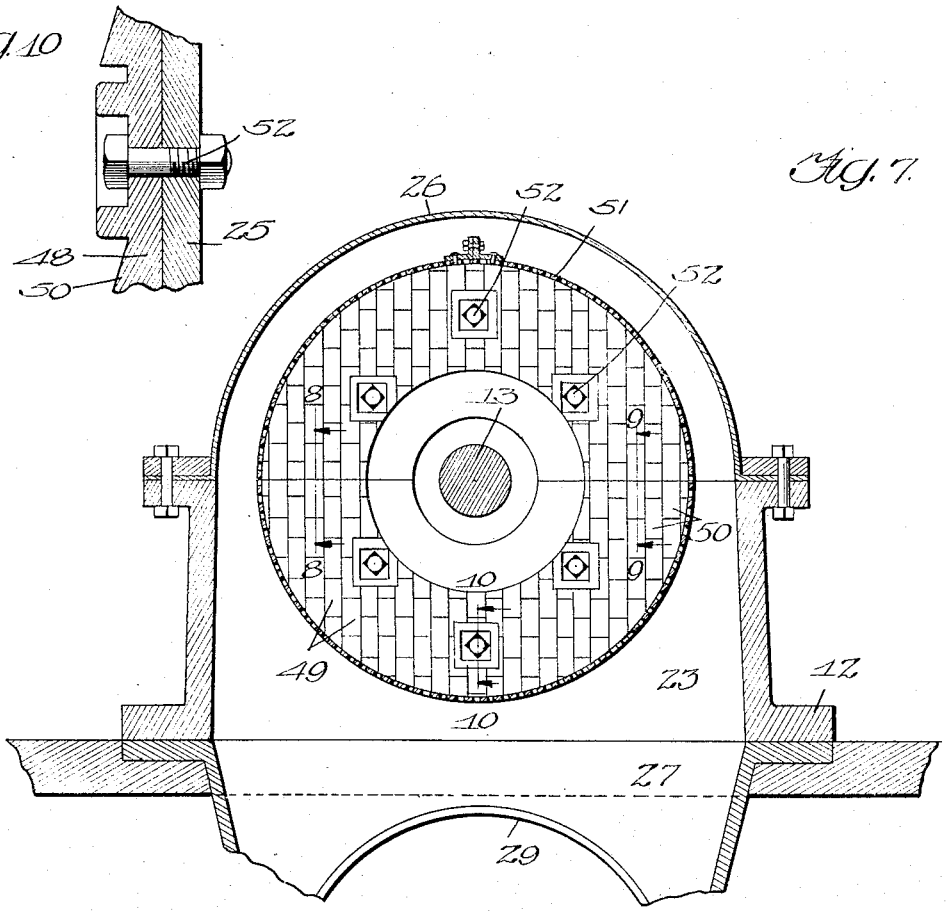
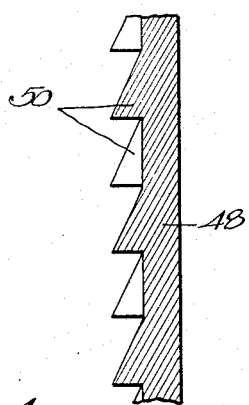
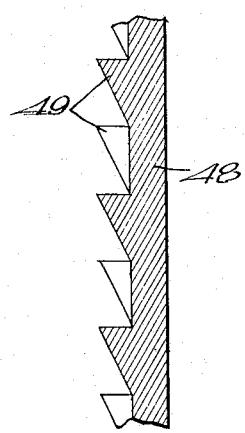
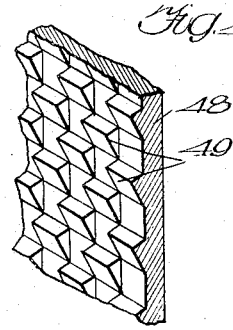
Witnesses:
Inventor:
Christian Marius Lauritzen
By O. R. Barnett
Atty

UNITED STATES PATENT OFFICE.

CHRISTIAN MARIUS LAURITZEN, OF CHICAGO, ILLINOIS.

MACHINE FOR CUTTING, BEATING, AND PULVERIZING.

939,276.

Specification of Letters Patent.  Patented Nov. 9, 1909.

Application filed February 29, 1908. Serial No. 418,495.

*To all whom it may concern:*

Be it known that I, CHRISTIAN MARIUS LAURITZEN, a citizen of the United States, residing at Chicago, in the county of Cook and State of Illinois, have invented certain new and useful Improvements in Machines for Cutting, Beating, and Pulverizing, of which the following is a specification.

My invention relates to machines for cutting, beating and pulverizing materials, and has for its object to provide a machine which will cut the materials and reduce them to a finely divided state more effectively than the machines now in use, which will accomplish the cutting and beating steps continuously and which shall be simple and relatively economical in its construction.

The machine is particularly designed and adapted for treating alfalfa hay so as to reduce it to proper form for cattle fodder. Alfalfa hay is very tough, often containing hard stalks, and, in order to make a good cattle fodder of it, it has to be reduced to a relatively finely divided state. If hard, brittle pieces of any considerable size are allowed to remain in the fodder, they are likely to injure the mouths of the cattle, especially of the younger cattle. It has been usual to cut up this material with the ordinary farm hay-cutters and to beat it afterward in beating machines of one kind or another. This involves two handlings of the material.

The machines ordinarily used do not accomplish the reduction of the material effectively and uniformly.

It is one of the objects of my invention to provide a cutter which will cut the material to any degree of fineness and accomplish the work uniformly.

It is a further object of the invention to so construct the cutter that it will act as a screw conveyer to convey the material lengthwise of itself into a beating chamber located at the end of the cutter. By this means the cutter and the devices for beating or pulverizing may be located upon the same shaft and the two steps in the treatment of the hay may be carried on successively and continuously by one machine.

It is a further object of my invention to provide the walls of the chamber containing the cutter with a series of knives which, in coöperation with the knives of the cutter, further reduce the material while it is passing lengthwise through the cutting chamber.

Another object of my invention is to provide a new and more effective beating apparatus for carrying out the second step of the treatment.

The invention has for further objects the other new and improved constructions, arrangements and devices described in the specification and set forth in the claims appended thereto.

It is obvious that the machine may be used for the treatment of other material besides alfalfa hay.

The invention, in one of its preferred embodiments, is illustrated in the accompanying drawings, wherein—

Figure 1 is a side elevation of the machine, certain parts being shown in vertical section. Fig. 2 is a longitudinal, vertical section through the same. Fig. 3 is a vertical cross section taken on the line 3—3 of Fig. 2, looking in the direction of the arrows. Fig. 4 is an end view in detail of the gears on the feed rollers. Fig. 5 is one of the dentated, cutting-chamber liners in perspective. Fig. 6 is a partial end view of the cutter head. Fig. 7 is a vertical section on the line 7—7 of Fig. 2, looking in the direction of the arrows. Fig. 8 is a section on the line 8—8 of Fig. 7, looking in the direction of the arrows. Fig. 9 is a section on the line 9—9 of Fig. 7, looking in the direction of the arrows. Fig. 10 is a section on the line 10—10 of Fig. 7, looking in the direction of the arrows. Fig. 11 is a perspective view of a portion of one of the end liners of the beating chamber. Fig. 12 is a detail in sectional plan illustrating the cutter bar.

Like characters of reference indicate like parts in the several figures of the drawings.

12 represents the base of the machine, 13 the main shaft mounted in the bearing boxes 14, 15 on the base 12 and carrying a flywheel 16 and belt pulley 17. A cylindrical cutting chamber 18 is formed by the lower casting 19, having supporting webs 20 and the upper casting 21, which castings are cut out at 22 to form a feed opening for the chamber.

At the end of the cutting chamber 18 is the beating chamber 23, which may be suitably formed by the end castings 24 and 25, covered by the sheathing 26. The hollow part of base 12 below the beating chamber forms a receiving chamber 27, into which opens an air return pipe 28, and from which leads the exhaust or intake 29, the material from the beating chamber falling into chamber 27, whence it is removed by exhaustion, in the familiar manner.

In front of the feed opening 22 are arranged a pair of feed rollers 30, 31, the lower roller 30 journaled in the standards 32, the upper roller 31 journaled in the blocks 33, which slide in guide-ways 34 in the upper ends of standards 32; the blocks 33 being normally forced to the bottom of the guide-ways by springs 35. At one end of the rollers 30, 31 the journals project beyond the standard and are provided with the gears 36, 37, respectively. On the end of the journal of roller 30 is a belt pulley 38. Within the cutting chamber 18 is a cutter-head 39 keyed on the shaft 13. The cutter-head is preferably of spiral construction, so that it acts as a screw conveyer to drive the material lengthwise through the cutting chamber. The cutter-head is provided with cutting edges which may be either formed directly on the cutter head or, as I have here shown them, are constituted by a number of curved cutting blades 40 fastened to the cutter-head by the screws 41. In order to still further sub-divide the material after the first cut has been given at the entrance of the feed chamber, I construct the inner wall of the feed chamber with a plurality of cutting edges. This may be done by lining the interior of the cutting chamber with the dentated liners 42, 43 the notches of which run longitudinally, as shown in Fig. 5. In order to provide a cutting edge with which the knives on the cutter-head coöperate, I place a cutter bar 44 in the feed opening, this bar being of tempered steel. The lower casting 19 is provided with the lugs 53, tapped for the set screws 54, the cutter bar being slotted at 55 and resting upon and attached to a lip 56 on the lower casting, this attachment being made by the counter-sunk screws 57. By this arrangement the cutter bar may be advanced as it wears. The cut thus made is a shearing cut, so that a very tough material may be successfully handled. The action of the cutter-conveyer 39, with its knives 40, driving the material spirally through the cutting chamber, results in subjecting it to a succession of shearing cuts, which are very effective in dividing the material finely and evenly.

The feed rollers 30, 31 may be driven at any speed necessary to feed the material in proper quantities to the cutting chamber. These rollers serve to press together and compact the material and at the same time to hold it firmly against the pull of the cutter-head, which, unless the feed of the material was restrained, would be likely to draw it into the cutting chamber, instead of shearing it off by a clean cut. The teeth of the gear wheels 36, 37 are long, so that a slight displacement of the upper roller will not disturb the mesh of the gear wheels. I have shown two dentated liners in the cutting chamber. Under some circumstances it would be as well to omit the lining in the upper half of the chamber.

The beaters are arranged on the shaft 13 within the beating chamber and may be of any desired form and arrangement. I have shown the beaters as consisting of a number of radial arms 45, set at different angles and provided with the wings 46, which may be inclined in different directions, as shown in Fig. 2. There is nothing novel in this arrangement of the beaters. They operate by impact to beat up, soften and disintegrate the material treated. In order, however, to increase the effectiveness of the beaters, I provide the ends of the beating chamber with liners 47 and 48, preferably made in semi-circular sections, these liners being formed with teeth turned in opposite directions on opposite sides of the machine. The teeth on the left hand side of Fig. 7, indicated by 49, are turned up, as shown in Fig. 8; the teeth 50 on the right hand side being inverted, as shown in Fig. 9, the arrow showing the direction of rotation of the shaft and beaters. The teeth on each side of the liner are opposed to the beaters. Preferably they are arranged staggered, as shown in Fig. 11. The beaters are surrounded by a cylindrical screen 51. The liners may be bolted to the end castings 24 or 25, as the case may be, by bolts 52, as shown in Fig. 10.

The operation of my machine is as follows: The material is fed into the cutting chamber by the feed rollers 30, 31, which will be driven at the proper speed by pulley 38, the elastic mounting of the upper roller accommodating for variation in the thickness of the material. The initial cut occurs between the edge 44 of the lower liner and the knives. The material is afterward subjected to a series of shearing cuts against the dentations of the liners and is finally delivered to the beating chamber, where it is beaten until fine enough to pass through the screen 51. From the beating chamber it falls into the receiving chamber 27, whence it may be removed by suction or in any other desired manner.

It will be seen that the cutting and beating operations are carried on in successive steps and continuously, the cutter being its own conveyer, delivering the cut material to the beating chamber. By this arrangement the cutter and the beaters may be keyed to the same high-speed shaft.

I wish it to be understood that I do not desire to limit myself to the exact devices, arrangements and constructions here shown, as obvious modifications might be made in the details of my machine without departure from my invention.

I claim:

1. In a machine of the character described, the combination with a cutting chamber, of a rotary cutter horizontally placed in said chamber constructed so as to convey the material lengthwise thereof, a beating chamber into which the cutter feeds, beaters in said beating chamber, and a common shaft extending through the cutting and beating chambers upon which the cutter and the beaters are arranged.

2. In a machine of the character described, the combination with a beating chamber, of a shaft therein, and a plurality of beaters on the shaft, an end of said chamber formed with teeth in opposition to the points of which the beaters work, the teeth being reversed on opposite sides of the shaft.

3. In a machine of the character described, the combination with a cutting chamber, of a horizontally placed rotary cutter constructed so as to drive the material lengthwise thereof, a beating chamber at the end of and communicating with the cutting chamber, beaters in said chamber, a common shaft extending through the cutting chamber and the beating chamber on which the cutter and the beaters are arranged, a receiving chamber under the beating chamber and a screen between the beating chamber and the receiving chamber through which the material passes from one chamber to the other.

4. In a machine of the character described, the combination with a horizontal, cylindrical cutting chamber, of a beating chamber at the end of the cutting chamber and in communication therewith, a common shaft extending through said chambers, a screw-like cutter and conveyer having spiral edges arranged on the shaft in the cutting chamber, the wall of the cutting chamber being provided with cutting edges in opposition to which the spiral cutter and conveyer operates, beaters on the shaft within the beating chamber, and a screen around said beaters.

5. In a machine of the character described, the combination with a horizontal, cylindrical cutting chamber, of a beating chamber at the end of the cutting chamber and in communication therewith, a common shaft extending through said chambers, a screw-like cutter and conveyer having spiral edges arranged on the shaft in the cutting chamber, the wall of the cutting chamber being provided with cutting edges in opposition to which the spiral cutter and conveyer operates, beaters on the shaft within the beating chamber, the end walls of the beating chamber being provided with teeth against which the material treated is driven by the action of the beaters, and a screen surrounding said beaters.

6. In a machine of the character described, the combination with a cylindrical cutting chamber closed except for a feed opening and for a discharge opening at one end, of a screw like rotary cutter and conveyer which cuts the material fed into the chamber, and conveys it lengthwise thereof, and through the discharge opening, a beating chamber communicating with the cutting chamber through said discharge opening, rotary impact beaters in said beating chamber which beat the cut material while in suspension in the air in said chamber and receiving means which receives the material from the beating chamber.

7. In a machine of the character described, the combination with a cylindrical cutting chamber closed except for a feed opening and for a discharge opening at one end, of a screw like rotary cutter and conveyer which cuts the material fed into the chamber and conveys it lengthwise thereof and through the discharge opening, a beating chamber, communicating with the cutting chamber through said discharge opening, rotary impact beaters in said beating chamber which beat the cut material while in suspension in the air in said chamber, receiving means which receives the material from the beating chamber, and a screen between the beating chamber and the receiving means.

8. In a machine of the character described, the combination with a cylindrical cutting chamber closed except for a feed opening and for a discharge opening at one end, and provided with longitudinal cutting edges on its inner wall, of a screw-like rotary cutter and conveyer which cuts the material fed into the chamber and conveys it lengthwise thereof and through the discharge opening, a beating chamber in communication with the cutting chamber through said discharge opening, rotary impact beaters in said beating chamber which beat the cut material while in suspension in the air in said chamber and receiving means which receives the material from the beating chamber.

9. In a machine of the character described, the combination with a cylindrical cutting chamber closed except for a feed opening and for a discharge opening at one end and provided with straight longitudinal corrugations having cutting edges on its inner wall, of a screw-like rotary cutter and conveyer, provided with spiral cutting blades which cut the material fed into the chamber and convey it lengthwise thereof and through the discharge opening, a beating chamber in communication with the cutting chamber through said discharge opening, rotary impact beaters in said beating chamber which beat the cut material while in suspension in the air in said chamber and receiving means which receives the material from the beating chamber.

10. In a machine of the character described, the combination with a cylindrical cutting chamber closed except for a feed opening in the side and a discharge opening in one end, a beating chamber in communication with the cutting chamber through said discharge opening, a single shaft extending through both said chambers, a screw-like rotary cutter and conveyer arranged on the shaft in the cutting chamber, impact beaters on the part of said shaft within the beating chamber which beat the cut material while in suspension in the air in said chamber, and receiving means which receives the material from the beating chamber.

11. In a machine of the character described, the combination with a cylindrical cutting chamber closed except for a feed opening in the side and a discharge opening in one end, of a screw-like rotary cutter and conveyer in said chamber which cuts the material as it is fed through the feed opening and conveys the same lengthwise thereof and through the discharge opening, a beating chamber in communication with the cutting chamber through said discharge opening, impact beaters in said beating chamber which beat the cut material while in suspension in the air in said chamber, receiving means which receives the material from the beating chamber and feed rolls for continuously feeding the material into said cutting chamber through the feed opening in the side thereof.

12. In a machine of the character described, the combination with a cylindrical cutting chamber closed except for a feed opening in the side and a discharge opening in one end, and provided with longitudinal cutting edges on its inner wall, of a screw-like rotary cutter and conveyer in said chamber which cuts the material as it is fed into the chamber and which in coöperation with the cutting edges on the wall of said chamber further cuts and conveys the same lengthwise of said chamber, a beating chamber in communication with the cutting chamber through said discharge opening, rotary impact beaters in said beating chamber which beat the cut material while in suspension in the air in said chamber, receiving means which receives the material from the beating chamber and feed rollers which continuously feed material into the cutting chamber through the feed opening.

13. In a machine of the character described, the combination with a cylindrical cutting chamber closed except for a feed opening and for a discharge opening at one end, of a screw-like rotary cutter and conveyer which cuts the material fed into the chamber and conveys it lengthwise thereof and through the discharge opening, a beating chamber which communicates with the cutting chamber through said discharge opening so that it receives the cut material centrally of said beating chamber, rotary impact beaters in said beating chamber which beat the cut material while in suspension in the air in said chamber, and receiving means which receives the material from the beating chamber.

CHRISTIAN MARIUS LAURITZEN.

Witnesses:
P. H. TRUMAN,
G. Y. SKINNER.